(12) United States Patent
Marsolek et al.

(10) Patent No.: US 10,024,708 B2
(45) Date of Patent: Jul. 17, 2018

(54) COLD PLANER YIELD MEASUREMENT SYSTEM

(71) Applicant: Caterpillar Paving Products Inc., Brooklyn Park, MN (US)

(72) Inventors: John Lee Marsolek, Watertown, MN (US); Nicholas Argenziano, Otsego, MN (US); Eric S. Engelmann, Delano, MN (US); James Alvin Aardema, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 405 days.

(21) Appl. No.: 14/720,406

(22) Filed: May 22, 2015

(65) Prior Publication Data

US 2016/0341595 A1  Nov. 24, 2016

(51) Int. Cl.
| | |
|---|---|
| *G01G 11/00* | (2006.01) |
| *G01F 1/76* | (2006.01) |
| *G01G 19/00* | (2006.01) |
| *G01F 1/78* | (2006.01) |
| *G01F 13/00* | (2006.01) |

(52) U.S. Cl.
CPC ............. *G01G 11/006* (2013.01); *G01F 1/76* (2013.01); *G01F 1/78* (2013.01); *G01G 19/00* (2013.01); *G01F 13/003* (2013.01)

(58) Field of Classification Search
CPC .................................................. G01G 11/006
See application file for complete search history.

(56) References Cited

U.S. PATENT DOCUMENTS

| | | | | |
|---|---|---|---|---|
| 5,959,257 | A | * | 9/1999 | Campbell ............ G01G 11/003 177/119 |
| 7,193,162 | B2 | | 3/2007 | McIsaac et al. |
| 8,118,246 | B2 | * | 2/2012 | Yamaguchi ........... B02C 21/026 241/101.74 |
| 2012/0203505 | A1 | * | 8/2012 | Burrell ............... G01G 23/3735 702/175 |
| 2014/0244208 | A1 | | 8/2014 | Paulsen et al. |

FOREIGN PATENT DOCUMENTS

| | | |
|---|---|---|
| CA | 2 361 973 A1 | 5/2003 |
| CA | 2 387 444 A1 | 11/2003 |
| DE | 10 2009 053 316 A1 | 12/2011 |

* cited by examiner

*Primary Examiner* — Paul West
(74) *Attorney, Agent, or Firm* — Finnegan, Henderson, Farabow, Garrett & Dunner, LLP (57) ABSTRACT

A yield measurement system for a cold planer having a conveyor is disclosed. The yield measurement system may include a hydraulic motor configured to propel the conveyor, a first sensor configured to generate a first signal indicative of a force acting on the conveyor by material being moved by the conveyor, and a second sensor configured to generate a second signal indicative of a pressure differential across the hydraulic motor. The yield measurement system may also include a controller in communication with the first and second sensors. The controller may be configured to determine when the conveyor is not transferring material based on the second signal, and automatically recalibrate the yield measurement system based on the first signal when the conveyor is not transferring material.

11 Claims, 3 Drawing Sheets

COLD PLANER YIELD MEASUREMENT SYSTEM

TECHNICAL FIELD

The present disclosure relates generally to a measurement system and, more particularly, to a yield measurement system for a cold planer.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator's station, a milling drum, and conveyors. The milling drum, fitted with cutting tools, is rotated through a suitable interface with the engine to break up the surface of the roadway. The broken up roadway material is deposited by the milling drum onto the conveyors, which transfer the broken up material into haul vehicles for removal from the worksite. As haul vehicles are filled, they are replaced with empty haul vehicles. The filled trucks transport the broken up material to a different location to be reused as aggregate in new asphalt or otherwise recycled. This transport process repeats until the milling process is finished.

Operators may wish to fill each truck to a maximum legal or desired capacity before replacing it with an empty truck in order to reduce waste, improve efficiency, and comply with applicable laws. To help calculate how much material has been milled and loaded into a truck, manufacturers have equipped conveyors with material measurement systems. Known measurement systems typically sense a parameter indicative of the force required to support material on the conveyor or the power used to load it into the truck. During operation, however, milled material and other debris can accumulate on and around the parts of a conveyor, which can reduce the accuracy of the measurement system over time.

One attempt to monitor the weight of material moved by a conveyor is disclosed in U.S. Pat. No. 7,193,162 that issued to McIsaac et al. on Mar. 20, 2007 ("the '162 patent"). In particular, the '162 patent discloses a system for measuring the weight of material moved by a conveyor based on the power consumed by an electric motor that drives the conveyor. The power consumed by the electric motor is measured with a watt transducer. A watt transducer reading is taken once per day when there is no material on the conveyor to determine a "no load" power consumption. Power consumed in excess of the "no load" power is correlated to the weight of material moved by the conveyor using a calibration relationship. The weight of material moved by the conveyor is tabulated over a period of time to determine a material production rate. Power consumed at or below the "no load" power is separately tabulated and not included in the weight determination. Surges in the power consumed by the electric motor that occur during the initial startup of the conveyor are also separately tabulated and excluded from the weight determination.

While the system of the '162 patent may determine the weight of material moved by a conveyor under some circumstances, it may not be optimum. In particular, the system of the '162 patent may produce inaccurate results when the actual "no load" value increases throughout the day. Further, if the "no load" power drops below the initial "no load" reading during that day, the weight of material needed to increase the load on the motor to the initial "no load" power may be erroneously omitted from the determination of material weight moved by the conveyor.

The yield measurement system of the present disclosure solves one or more of the problems set forth above and/or other problems in the art.

SUMMARY

In one aspect, the present disclosure is related to a yield measurement system for a cold planer having a conveyor. The yield measurement system may include a hydraulic motor configured to propel the conveyor, a first sensor configured to generate a first signal indicative of a force acting on the conveyor by material being moved by the conveyor, and a second sensor configured to generate a second signal indicative of a pressure differential across the hydraulic motor. The yield measurement system may also include a controller in communication with the first and second sensors. The controller may be configured to determine when the conveyor is not transferring material based on the second signal, and automatically recalibrate the yield measurement system based on the first signal when the conveyor is not transferring material.

In another aspect, the present disclosure is related to a method of operating a yield measurement system for a cold planer having conveyor driven by a hydraulic motor. The method may include receiving a first signal indicative of a force on the conveyor applied by material being transferred by the conveyor, receiving a second signal indicative of a pressure differential across the hydraulic motor, determining when the conveyor is not transferring material based on the second signal, and automatically recalibrating the yield measurement system based on the first signal when the conveyor is not transferring material.

In yet another aspect, the present disclosure is directed to a yield measurement system for a cold planer having a conveyor. The yield measurement system may include a first sensor configured to generate a first signal indicative of a pressure differential across the hydraulic motor, and a controller in communication with the first sensor. The controller may be configured to determine when the conveyor is not transferring material based on the first signal, and automatically recalibrate the yield measurement system based on the first signal when the conveyor is not transferring material.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. It is contemplated that the disclosed cold planer may also or alternatively be used to remove cement and other roadway surfaces, or to remove non-roadway surface material such as in a mining operation.

Figure 1:
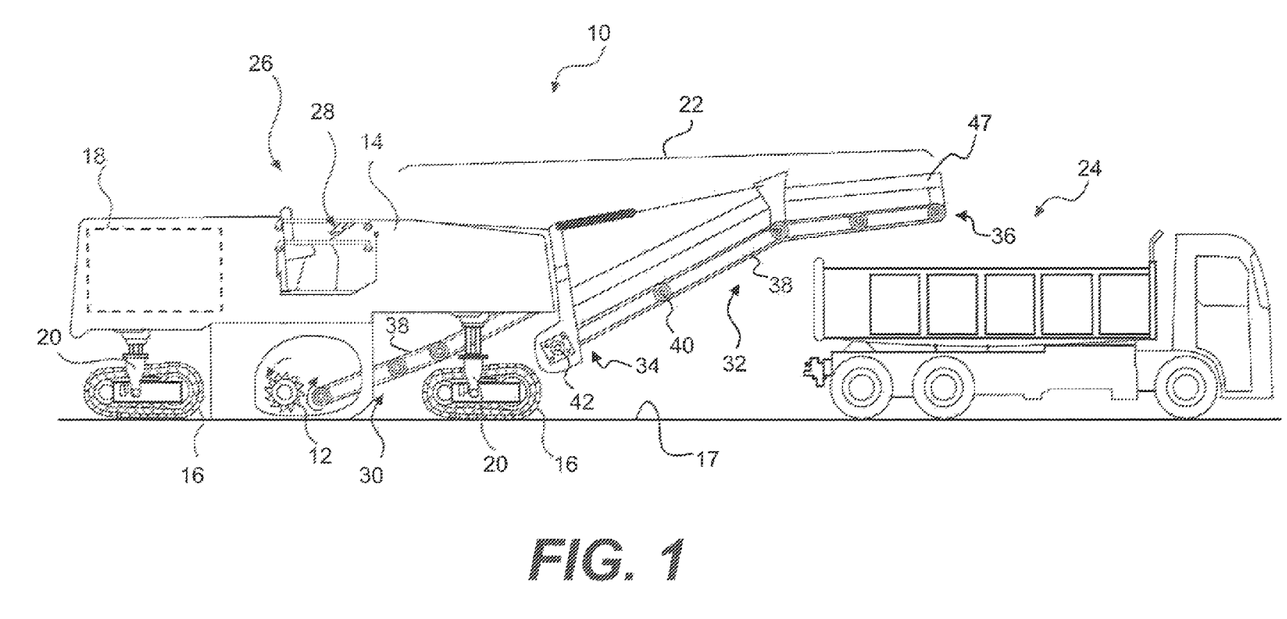
FIG. 1 is a cutaway view illustration of an exemplary disclosed cold planer.

FIG. 1 illustrates an exemplary cold planer 10 having a frame 14 supported by one or more traction devices 16, a milling drum 12 rotationally supported under a belly of frame 14, and an engine 18 mounted to frame 14 and configured to drive milling drum 12 and traction devices 16. Traction devices 16 may include either wheels or tracks connected to actuators 20 that are adapted to controllably raise and lower frame 14 relative to a ground surface. It should be noted that, in the disclosed embodiment, raising and lowering of frame 14 may also function to vary a milling depth of milling drum 12 into a work surface 17. In some embodiments, the same or different actuators 20 may also be used to steer cold planer 10 and or to adjust a travel speed of traction devices 16 (e.g., to speed up or brake traction devices 16), if desired. A conveyor system 22 may be connected at a leading end to frame 14 and configured to transport material away from milling drum 12 and into a receptacle, such as a waiting haul vehicle 24. Other types of receptacles may be used, if desired.

Frame 14 may also support an operator station 26 at a side opposite milling drum 12. Operator station 26 may house any number of interface devices 28 used to control cold planer 10. In the disclosed example, interface devices 28 include, among other things, a display 28a, a warning device 28b, and an input device 28c (28a-c shown only in FIG. 3). In other embodiments, operator station 26 may be offboard cold planer 10. For example, operator station 26 may embody a remote control, such as a handheld controller, that an operator may use to control cold planer 10 from anywhere on a jobsite. Operator station 26 may alternatively embody a software program and user interface for a computer, and may include a combination of hardware and software. In other embodiments, cold planer 10 may be autonomous and may not include operator station 26.

Figure 3:
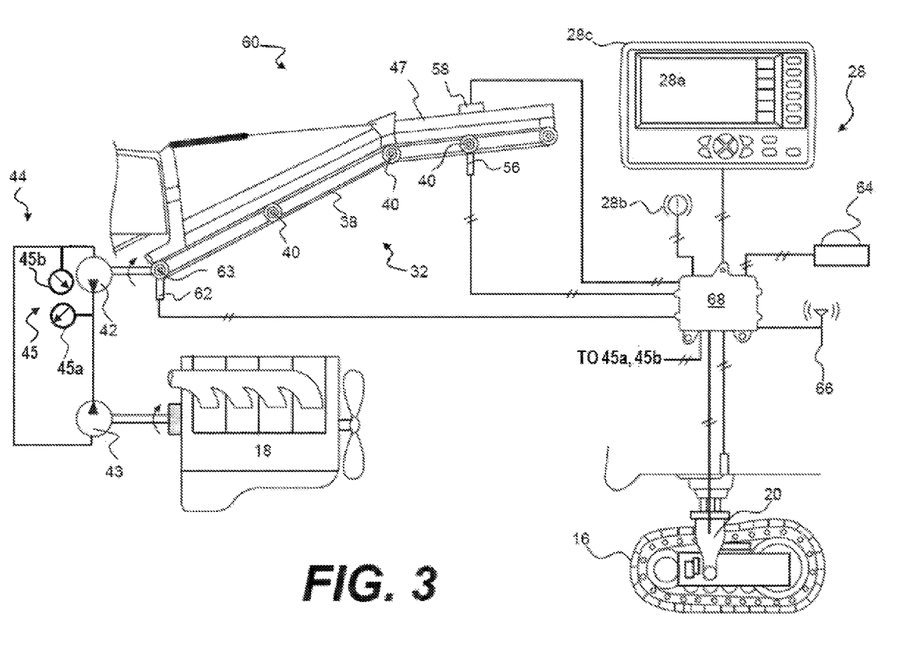
FIG. 3 is a diagrammatic illustration of an exemplary disclosed yield measurement system that may be used with the cold planer of FIG. 1.

Display 28a may be configured to render the location of cold planer 10 (e.g., of milling drum 12) relative to features of the jobsite (e.g., milled and/or unmilled parts of work surface 17), and to display data and/or other information to the operator. Warning device 28b may be configured to audibly and/or visually alert the operator of cold planer 10 as to a proximity of milling drum 12 to the jobsite features, and/or when certain pieces of data exceed an associated threshold. Input device 28c may be configured to receive data and/or control instructions from the operator of cold planer 10. Other interface devices (e.g., control devices) may also be possible, and one or more of the interface devices described above could be combined into a single interface device, if desired.

Input device 28c may be, for example, an analog input device that receives control instructions via one or more buttons, switches, dials, levers, etc. Input device 28c may also or alternatively include digital components, such as one or more soft keys, touch screens, and/or visual displays. Input device 28c may be configured to generate one or more signals indicative of various parameters associated with cold planer 10 and/or its surrounding environment based on input received from the operator.

In one embodiment, input device 28c may be configured to receive an operator selection indicative of a type or condition of the receptacle in which milled material is being deposited. For example, the operator may select haul vehicle 24 from a list of different types of haul vehicles and/or other types of partially mobile or stationary receptacles. A predetermined volumetric capacity, shape or image, tare weight, and/or other parameters may be associated with each type of receptacle. Input device 28c may also or alternatively be configured to allow the operator to manually enter the volumetric capacity, shape, tare weight, and/or other parameter. Input device 28c may also be configured to allow the operator to indicate when a receptacle is empty and/or ready to be filled. For example, the operator may press a button or actuate another feature of input device 28c when an empty receptacle has arrived and is ready to be filled after the previous receptacle has been filled and/or hauled away. The receptacle information may be sent to and/or stored in a controller 68 (referring to FIG. 3) and used for further processing.

Input device 28c may also be configured to receive an operator selection indicative of a vehicular weight limit $W_L$ (e.g., the weight limit of haul vehicle 24). Weight limits may be imposed on particular roadways by governing authorities (e.g., which may carry associated fines and/or penalties for infraction) or by fleet operators (e.g., to achieve optimum efficiency). Input device 28c may be configured to allow the operator to select from a predetermined list or to manually enter the weight limit $W_L$. The weight limit $W_L$ may be sent to and/or stored in controller 68 (referring to FIG. 3) and used for further processing.

Conveyor system 22 may include a first conveyor 30 adjacent milling drum 12 that is configured to transfer milled material to a second conveyor 32. Conveyor 32 may receive the milled material at a first end 34 positioned below conveyor 30, and dispense the milled material into haul vehicle 24 at an elevated second end 36. Conveyor 32 may be rotatably attached to frame 14 at first end 34, so that the height at which milled material leaves conveyor 32 at second end 36 may be adjusted.

Conveyors 30 and 32 may each include a belt 38 that is supported on a plurality of roller assemblies 40 and driven by a motor 42 (only one shown in FIG. 1). Motor 42 may embody, for example, a hydraulic motor 42 powered by a hydraulic system 44 (referring to FIG. 3). Hydraulic system 44 may include a pump 43 that is fluidly connected to drive motor 42. Pump 43 is shown in FIG. 3 as being driven by engine 18, but may alternatively be driven by another power source, if desired. In other embodiments, motor 42 may embody an electric motor, which may be powered by a generator drivingly connected to engine 18 or by another power source. Returning to FIG. 1, conveyor 32 may include a cover 47 to inhibit external debris from falling and/or accumulating on belt 38 and other components of conveyor 32.

Hydraulic system 44 may include a pressure sensor 45 that is fluidly connected to hydraulic system 44 and configured to generate a signal indicative of a pressure differential across motor 44. Pressure sensor 45 may include one or more sensors. For example, pressure sensor 45 may include a first pressure transducer 45a and a second pressure transducer 45b. First and second pressure transducers 45a, 45b may each be fluidly connected to hydraulic system 44 and configured to generate a signal indicative of a pressure within hydraulic system 44. Together, the signals from first and second pressure transducers 45a, 45b may be indicative of a pressure differential across motor 42 For example, the difference between the pressure indicated by first pressure transducer 45a and the pressure indicated by second pressure transducer 45b may be equal to the pressure differential across motor 42. Alternatively, pressure sensor 45 may include a single pressure transducer that is configured to generate a signal indicative of the pressure differential across motor 42.

Figure 2:
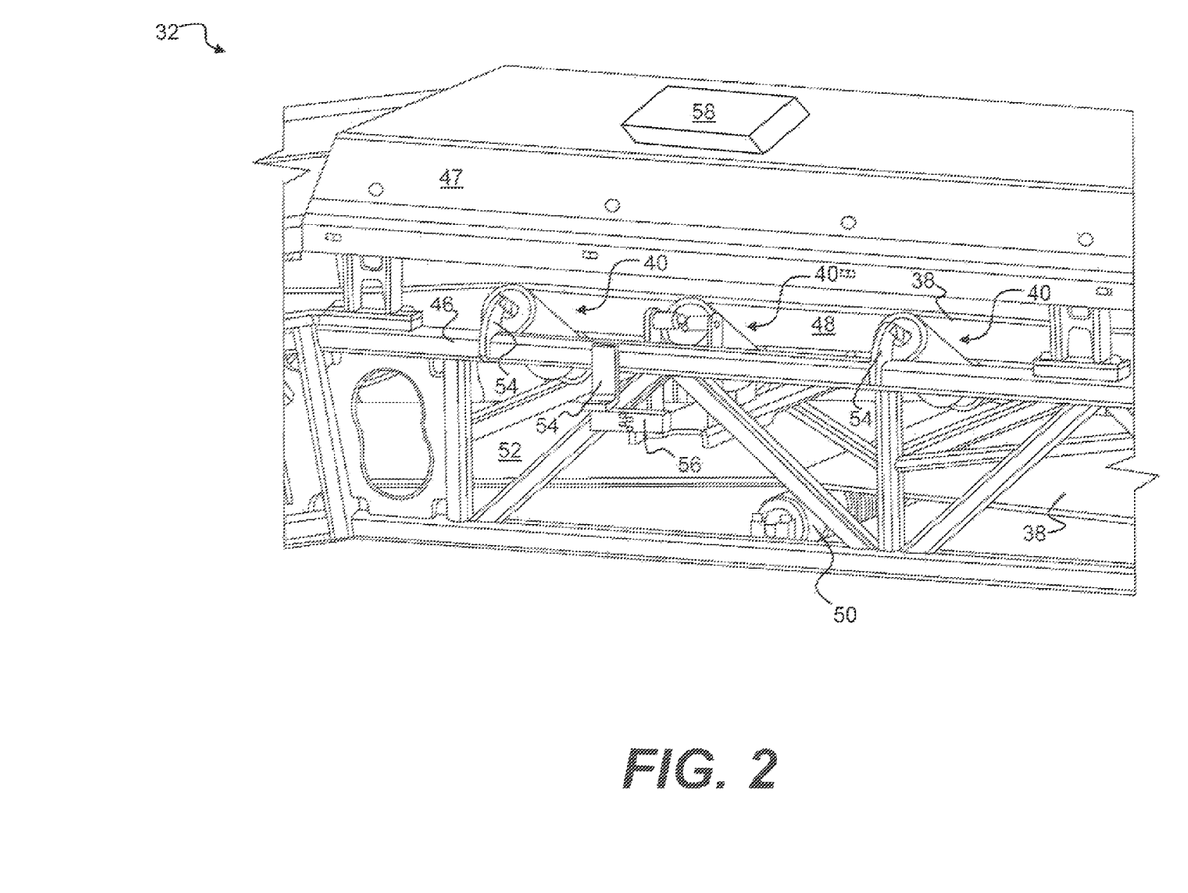
FIG. 2 is a perspective illustration of an exemplary disclosed conveyor that may be used with the cold planer of FIG. 2.

As shown in FIG. 2, conveyor 32 may further include a frame 46 that is configured to support roller assemblies 40 and cover 47. Roller assemblies 40 may be attached to frame 46 and configured to support an upper portion 48 of belt 38. Upper portion 48 of belt 38 may carry milled material from first end 34 (referring to FIG. 1) to second end 36 of conveyor 32, as belt 38 is driven by motor 42. Return idlers 50 (only one shown in FIG. 2) may be attached to frame 46 and configured to support a lower portion 52 of belt 38 as it returns to first end 34 to collect more material.

Under the weight of milled material, belt 38 may apply a downward force on roller assemblies 40 during travel of belt 38 from first end 34 (referring to FIG. 1) to second end 36 of conveyor 32. Roller assemblies 40 may be attached to frame 46 via anchors 54 and configured to support this downward force. To help determine the magnitude of the downward force, at least one roller assembly 40 may include a force transducer 56. For example, force transducer 56 may be attached between roller assembly 40 and anchor 54, so that the downward force (i.e., gravitational force normal to belt 38) caused by the weight of milled material acts on force transducer 56. Force transducer 56 may be configured to generate an electrical signal in response to an applied force, and the signal may be indicative of the magnitude of the force acting on conveyor 32 by the weight of milled material. In one embodiment, force transducer 56 may be a load cell containing a strain gauge (e.g., wire, thin film, elastic element, electrical resistance, foil, etc.). It is understood, however, that other types of force transducers, such as piezoelectric crystal devices, magneto-elastic devices, vibrating elements, etc., may be used, if desired.

At times, the magnitude of the downward force sensed by force transducer 56 may depend upon the angle of inclination θ of conveyor 32. That is, when conveyor 32 is level (i.e., having an angle of inclination θ of 0° with respect to the horizontal plane), the magnitude of the downward force sensed by force transducer 56 may be greatest since the downward force is fully normal to belt 38. As the angle of inclination θ increases, such as when second end 36 conveyor 32 is raised to a higher position, a component of the downward gravitational force may no longer be normal to belt 38, and the magnitude of force sensed by force transducer 56 may be reduced. The component of the downward force that remains normal to belt 38 may be proportional to the cosine of the angle of inclination θ.

To help determine the angle of inclination of conveyor 32, conveyor system 22 may include an inclinometer 58 that is configured to generate a signal indicative of the angle of conveyor 32 with respect to an absolute or relative horizontal plane. Inclinometer 58 may be positioned such that, when conveyor 32 is moved to any position during operation, inclinometer 58 remains in a fixed position and orientation with respect to belt 38. For example, inclinometer 58 may be positioned on cover 47, frame 46, roller assembly 40, or another component of conveyor system 22. In some embodiments, a single inclinometer 58 may be used to determine the angle of inclination θ for one or more roller assemblies 40. In other embodiments, multiple inclinometers 58 may be used and their signals processed (e.g., by averaging or other techniques) to achieve greater accuracy. In embodiments where conveyor 32 includes portions having different angles of inclination θ, one or more inclinometers 58 may be associated with each portion where a force transducer 56 is also used. In situations where the surface on which cold planer is operating is generally level with the horizontal, the angle of inclination may alternatively be determined based on the positions of actuators (20) and known offsets of conveyor 32, if desired.

As illustrated in FIG. 3, a yield measurement system 60 ("system") may be associated with cold planer 10 and include elements that cooperate to determine a mass flow rate ṁ of milled material being discharged by cold planer 10, a total weight $W_m$ ("weight") of milled material that has been transferred by cold planer 10, a fill level Σ of haul vehicle 24, and/or other statistical information. These elements may include interface device 28, pressure transducer 45, force transducer 56, inclinometer 58, a speed sensor 62, a locating device 64, a communication device 66, and a controller 68 connected with each of the other elements. Information, including the mass flow rate ṁ, weight $W_m$, and fill level Σ, may be shown to the operator of cold planer 10 via display 28a and used by the operator and/or controller 68 to regulate operating parameters of cold planer 10 (e.g., travel speed, drum rotational speed, milling depth, etc.) and/or to dispatch haul vehicle 24. This information and/or other data may be sent offboard cold planer 10 via communication device 66 for use by jobsite management and/or for back office analysis.

Speed sensor 62 may be configured to generate a signal indicative of a linear belt speed ν of belt 38. For example, speed sensor 62 may be a shaft-driven sensor that is attached to a pulley 63 driven by motor 42 and is in contact with belt 38. Speed sensor 62 may alternatively be attached to a shaft of motor 42, and its signal may also be indicative of the speed of motor 42. In some embodiments, multiple speed sensors 62 may be utilized and their outputs processed by controller 68 in order to reduce inaccuracies caused by slipping of belt 38. Speed sensor 62 may alternatively embody a wheel-driven sensor in contact with belt 38 and mounted to roller assembly 40 or to another location on frame 46. Speed sensor 62 may detect the speed of a shaft or wheel using magnetic, optical, pulsating, or other types of sensing elements. Speed sensor 62 may embody a different type of sensor, if desired. Signals generated by speed sensor 62 may be communicated to controller 68 and used for further processing.

Locating device 64 may be configured to generate a signal indicative of a geographical position of the cold planer 10 relative to a local reference point, a coordinate system associated with the work area, a coordinate system associated with Earth, or any other type of 2-D or 3-D coordinate system. For example, locating device 64 may embody an electronic receiver configured to communicate with one or more satellites, or a local radio or laser transmitting system used to determine a relative geographical location of itself. Locating device 64 may receive and analyze high-frequency, low-power radio or laser signals from multiple locations to triangulate a relative 3-D geographical position. A signal indicative of this geographical position may then be communicated from locating device 64 to controller 68. In some embodiments, the signal generated by locating device 64 may be correlated with other information, such as the mass flow rate ṁ, weight $W_m$, and fill level Σ determined by controller 68, and used to generate an electronic map of the job site that indicates how much material was removed at various locations.

Communication device 66 may include hardware and/or software that enables sending and receiving of data messages between controller 68 and the offboard entity. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enables communication device 66 to exchange information.

Controller 68 may be configured to determine a mass flow rate ṁ of milled material being transferred by conveyor 32 and to show the mass flow rate ṁ on display 28a. For example, controller 68 may receive the signal from force transducer 56 that is indicative of the magnitude of a normal force $F_N$ acting normal to upper portion 48 of belt 38. Based on the signal from inclinometer 58, controller 68 may determine the angle of inclination θ of conveyor 32, and use the angle to determine the magnitude of a total force F that is acting on conveyor 32. The total force F may be indicative of an amount of force applied to belt conveyor 32 by the effects of gravity on the milled material being supported by belt 38. That is, the total force F may be proportional to the normal force $F_N$ (as sensed by force transducer 56) divided by the cosine of the angle of inclination θ, as shown in EQ1.

$$F=F_N/\cos(\theta) \qquad \text{EQ1}$$

Controller 68 may determine the total force F each time the signal from force transducer 56 is received. The total force F may be indicative of a mass m of the milled material that corresponds to the total force F, and controller 68 may determine the mass m based on the total force F and the acceleration g of the milled material caused by the effects of gravity, as shown in EQ2.

$$m=F/g \qquad \text{EQ2}$$

Controller 68 may be configured to determine the speed v of belt 38 based on the signal from speed sensor 62. Using the belt speed v and the mass m as inputs, controller 68 may be configured to continuously determine the mass flow rate ṁ of material being transferred by conveyor 32, as shown in EQ3.

$$\dot{m}=F_N/v=F\cdot\cos(\theta)/v=m\cdot g\cdot\cos(\theta)/v \qquad \text{EQ3}$$

Controller 68 may also be configured to determine the total weight $W_m$ of material that has been transferred by conveyor 32 into haul vehicle 24 over an elapsed period of conveying time based on the mass flow rate ṁ. With positioning information from locating device 64, controller 68 may be configured to generate an electronic map of the jobsite that indicates how much material has been removed along the path of cold planer 10.

Controller 68 may also be configured to automatically recalibrate measurement system 60 when no material is being transferred by conveyor 32, in order to maintain the accuracy of force F, mass flow rate ṁ, and weight $W_m$ measurements. During operation of cold planer 10, milled material and/or other debris may accumulate on and around belt 38 and roller assemblies 40. The signal generated by force transducer 56 can increase as material accumulates, and may inaccurately reflect the amount of material being transferred into haul vehicle 24 until measurement system 60 is recalibrated or the accumulated material is removed. Thus, controller 68 may be configured to recalibrate measurement system 60 during operation of cold planer 10 when conveyor 32 is not transferring material in order to continuously restore measurement accuracy throughout the day.

Controller 68 may determine when conveyor 32 is not transferring material based on the signals from pressure transducers 45a, 45b. That is, the signal from pressure transducer 45 may be indicative of a pressure drop across motor 42, which may be indicative of a power P used to drive conveyor 32. Controller 68 may be configured to determine the power P used to drive conveyor 32 based on a pressure differential $\Delta_p$ across motor 42 and a volumetric flow rate Q of fluid in hydraulic system 44. For example, controller 68 may determine the pressure differential $\Delta_p$ based on the signal from pressure transducer 45. The volumetric flow rate Q may be determined, for example, based on a signal from a flowmeter disposed in hydraulic system 44 or based on the speed and displacement of motor 42 or pump 43. The displacement of motor 42 and pump 43 may be known values stored in the memory of controller 68, and the speed of motor 42 may be determined based on the signal from speed sensor 62. The speed of pump 43 may be determined based on a signal generated by a speed sensor associated with pump 43 or engine 18. The power P used to drive conveyor 32 may be equal to the product of the pressure differential $\Delta_p$ and the volumetric flow rate Q.

Controller 68 may be configured to determine when conveyor 32 is not transferring material based on a comparison of the power P to a tare power $P_T$. The tare power $P_T$ may be obtained through a calibration process during the startup of cold planer 10, during which controller 68 determines the power required to drive conveyor 32 without a load (i.e., before the milling process begins). Additionally, the operator may manually recalibrate the tare power $P_T$ during down time (e.g., while waiting for haul vehicle 24 to arrive) with conveyor 32 running while milling drum 12 and traction devices 16 are off (i.e., not rotating). During operation, controller 68 may determine that conveyor 32 is not transferring material when, for example, the power P is about equal to the tare power $P_T$. The power P may be about equal to the tare power $P_T$ when the power P is equal to or is within a certain range of the tare power $P_T$. Controller 68 may also or alternatively be configured to track an amount of time that the power P is at or below a threshold power, and to determine when conveyor 32 is not transferring material based on the amount of time. Controller 68 may also be configured to determine that conveyor 32 is not transferring material when the ground speed of cold planer 10 is zero and either enough time has passed for conveyor 32 to transfer any remaining material into haul vehicle 24 or the power P has reached a constant value. In this way, controller 68 may determine when conveyor 32 is not transferring material regardless of how much material has built up on roller assembly 40, and recalibrate measurement system 60 whenever conveyor is not transferring material.

Controller 68 may be configured to recalibrate measurement system 60 based on signals from force transducer 56 and/or pressure transducer 45 in order to update reference values, account for signal offsets, modify algorithms, etc., that are associated with measurement system 60. For example, controller 68 may recalibrate force transducer 56 with a zeroing function. Controller 68 may store in its memory a tare force $F_T$, which may be equal to the force exerted on force transducer 56 when no material is being transferred by conveyor 32. When controller 68 recalibrates force transducer 56, controller 68 may determine a current force exerted on force transducer 56 based on its output signal, and set the current force as the tare force $F_T$. That is, controller 68 may store a new tare force $F_T$ in its memory, and the new tare force $F_T$ may be equal to or based on (e.g., calculated with) the current force exerted on force transducer 56 when controller 68 determines that conveyor is not transferring material (e.g., when the power P is about equal to the tare power $P_T$). In this way, any additional force that is applied to force transducer 56 will increase the value of the output signal with respect to the new tare force $F_T$. The difference between future measurements and the tare force $F_T$ may represent additional force created by the weight of milled material being transferred by conveyor 32.

Controller 68 may also be configured to determine the mass flow rate $\dot{m}$ and/or weight $W_m$ of milled material based on the power P used to drive conveyor 32. Controller 68 may be configured to compare the mass flow rate $\dot{m}$ and/or weight $W_m$ of the milled material (as determined based on the signal from force transducer 56) with the mass flow rate $\dot{m}$ and/or weight $W_m$ (as determined based on the power P used to drive conveyor 32) in order to validate the accuracy of force transducer 56. Both sets of values may also or alternatively be processed by controller 68 (e.g., by an averaging process or other function) to achieve a more accurate determination of the mass flow rate $\dot{m}$ and/or weight $W_m$ of material being transferred by conveyor 32. That is, controller 68 may determine the mass flow rate $\dot{m}$ and weight $W_m$ based on the signal from force transducer 56, and in a separate process controller 68 may also determine the mass flow rate $\dot{m}$ and weight $W_m$ based on the signal from pressure transducer 45. Controller 68 may then input the results of the separate determinations into an algorithm, model, or other calculation to provide a more accurate determination of the mass flow rate $\dot{m}$ and the weight $W_m$ of milled material.

For example, based on the power P, controller 68 may be configured to determine the torque $\tau$ applied by belt 38 to a rotational device of conveyor system 22, such as pulley 63, an idler, a component of roller assembly 40, or another rotational device in contact with belt 38. For example, the torque $\tau$ may be equal to the power P divided by a rotational speed $\Omega$ of pulley 63. The speed $\Omega$ of pulley 63 may be determined using speed sensor 62. The torque $\tau$ may also be equal to a driving force $F_D$ needed to move belt 38 along conveyor 32 times the radius R of pulley 63, which may be a known value. The driving force $F_D$ may be equal to the force needed to move conveyor 32 at a certain speed. In this way, the driving force $F_D$ can be isolated and used for further calculation.

Similar to the way in which the angle of inclination $\theta$ of conveyor 32 can affect the magnitude of the normal force $F_N$ experienced by conveyor 32 under the weight $W_m$ of milled material, the angle of inclination $\theta$ may also affect the driving force $F_D$ needed to move conveyor 32 from first end 34 (referring to FIG. 1) to second end 36. That is, as the angle of inclination $\theta$ increases, the driving force $F_D$ may increase as more force is used to move the milled material on belt 38 in the vertical direction against a force of weight $F_w$ of the milled material (i.e. against the effect of gravity on the milled material). The force of weight $F_w$ of the milled material may be proportional to the product of the driving force $F_D$ and the sine of the angle of inclination $\theta$, as shown in EQ4. The mass m of milled material may be determined based on the force of weight $F_w$ and the acceleration g of the milled material caused by the effects of gravity, as shown in EQ5.

$$F_w = F_D \cdot \sin(\theta) \qquad \text{EQ4}$$

$$m = F_w / g \qquad \text{EQ5}$$

$$\dot{m} = F_w / v = m \cdot g / v \qquad \text{EQ6}$$

Using the belt speed v and the mass m determined in EQ5 as inputs, controller 68 may be configured to continuously determine the mass flow rate $\dot{m}$ of material being transferred by conveyor 32 using the relationship shown in EQ6 above. Controller 68 may also be configured to determine the weight $W_m$ of material that has been transferred by conveyor 32 into haul vehicle 24 over an elapsed period of conveying time based on the mass flow rate $\dot{m}$.

When controller 68 determines that conveyor 32 is not transferring material and recalibrates measurement system 60, controller 68 may also reset the tare power $P_T$. As material builds up on and around the moving components of conveyor system 22, the weight and friction associated with those components may increase and require more power from motor 42 to drive conveyor 32. Thus, controller 68 may reset the tare power $P_T$ so that future determinations of the power P needed to drive conveyor 32 are made more accurately, with respect to the new tare power $P_T$. Controller 68 may reset the tare power $P_T$ by determining the current power P and setting the tare power $P_T$ to the current power P.

Controller 68 may be configured to determine a total weight $W_{total}$ and the fill level $\Sigma$ of haul vehicle 24 based on the weight $W_m$ of the milled material and known features of haul vehicle 24 (e.g., geometry, volumetric capacity, shape, tare weight, weight limit $W_L$, etc.). Controller 68 may be configured to show one or more of the fill level $\Sigma$, mass flow rate $\dot{m}$, weight of the milled material $W_m$ and the total weight $W_{total}$ of haul vehicle 24 to the operator via display 28a, thereby allowing the operator to control cold planer 10 based on this information.

In some embodiments, controller 68 may be configured to automatically control some aspects of cold planer 10 and the milling process. For example, controller 68 may be configured to automatically control operations of cold planer 10 based on the fill level $\Sigma$ of haul vehicle 24. That is, controller 68 may monitor the fill level $\Sigma$ of haul vehicle 24, and automatically slow or stop the movement of traction devices 16, milling drum 12, and/or conveyor system 22 as the fill level $\Sigma$ approaches a threshold (e.g., 90% filled). It is understood that other thresholds may be used, if desired.

Controller 68 may also be configured to warn or otherwise notify the operator of cold planer 10 and/or the operator of haul vehicle 24 when the fill level $\Sigma$ of haul vehicle 24 reaches a threshold. For example, when the fill level $\Sigma$ reaches a threshold (e.g., 90% filled), controller 68 may generate a signal causing warning device 28b to visually or audibly notify the operator that haul vehicle 24 may soon reach the weight limit $W_L$. It is understood that greater or lower thresholds may be used, if desired. Controller 68 may be configured to change the warning signal in coordination with changes in the fill level $\Sigma$ (e.g., as the fill level $\Sigma$ increases), to allow warning device 28b to emit audible or visual warnings that are also coordinated with the changes in the fill level $\Sigma$.

In some embodiments, controller 68 may also be configured to manage communications between cold planer 10 and an offboard entity (e.g., haul vehicle 24, a central facility or another machine such as a trimming machine—not shown) via communication device 66. For example, controller 68 may transmit one or more of the mass flow rate $\dot{m}$, weight of the milled material $W_m$, the fill level $\Sigma$ of haul vehicle 24, and/or a number of haul vehicles 24 that have been filled offboard cold planer 10 for further processing and analysis. Controller 68 may also be configured to automatically command or request that a filled haul vehicle 24 be sent away and/or that an empty haul vehicle 24 be dispatched to cold planer 10 based on the fill level $\Sigma$.

Controller 68 may also be configured to receive data and/or instructions via communication device 66 from offboard transmitters associated with computers, receptacles, or other machines. For example, controller 68 may receive data and information from haul vehicle 24 (e.g., its maximum volume, weight limit $W_L$, number of axles, current fill level $\Sigma$, legal weight limits $W_L$ associated with its travel path, etc.). Controller 68 may use this data and information to determine the total weight $W_{total}$ and fill level $\Sigma$ of haul vehicle 24 during operation of cold planer 10.

Controller 68 may embody a single microprocessor or multiple microprocessors that include a means for monitoring operator and sensor input, and responsively adjusting operational characteristics of cold planer 10 based on the input. For example, controller 68 may include a memory, a secondary storage device, a clock, and a processor, such as a central processing unit or any other means for accomplishing a task consistent with the present disclosure. Numerous commercially available microprocessors can be configured to perform the functions of controller 68. It should be appreciated that controller 68 could readily embody a general machine controller capable of controlling numerous other machine functions. Various other known circuits may be associated with controller 68, including signal-conditioning circuitry, communication circuitry, and other appropriate circuitry. Controller 68 may be further communicatively coupled with an external computer system, instead of or in addition to including a computer system, as desired.

INDUSTRIAL APPLICABILITY

The disclosed measurement system may be used with any cold planer where accurately determining the mass flow rate and/or weight of milled material is important. The disclosed measurement system may determine the mass flow rate and/or weight of milled material by measuring the force applied to a conveyor of the cold planer with one or more of a force transducer and pressure transducer. A controller within the system may automatically recalibrate the system when the conveyor is not transferring material in order to restore accuracy and repeatability of the measurements. The disclosed measurement system may also provide for determining the fill level of a receptacle receiving the milled material and its weight relative to regulated weight limits. The disclosed measurement system may further provide for mapping of the amount of material removed from various areas of a jobsite, and communicating corresponding data offboard the cold planer. Operation of yield measurement system 60 will now be explained.

During operation of cold planer 10, milling drum 12 may remove a portion of work surface 17 in the path of cold planer 10 as it traverses work surface 17. Material removed by milling drum 12 may be transferred by first conveyor 30 to second conveyor 32, and conveyor 32 may discharge the material into haul vehicle 24.

As conveyor 32 transfers material from first end 34 to second end, one or more force transducers 56 attached to roller assemblies 40 may sense the weight of the material and generate a signal indicative of a force on conveyor 32. The force transducers 56 may communicate the signal to controller 68, and controller 68 may determine the normal force $F_N$ acting on belt 38 based on the signal.

Inclinometer 58 may generate a signal indicative of the angle of inclination θ of conveyor 32, and communicate the signal to controller 68. Based on the angle of inclination θ and the normal force $F_N$, controller 68 may determine the total force F applied to conveyor 32 by the milled material on belt 38 according to EQ1. Controller 68 may then determine the mass m of milled material based on the total force F and acceleration g due to gravity, according to EQ2. Using the mass m, the belt speed v, and the relationship shown in EQ3, controller 68 may determine the mass flow rate ṁ of material being transferred by conveyor 32. Controller 68 may also determine a total weight $W_m$ of milled material that has been transferred to haul vehicle 24 based on the mass m of the milled material and the speed of belt 38, as determined by speed sensor 62.

During operation of cold planer 10, pressure transducer 45 may monitor the pressure of hydraulic lines upstream and downstream of motor 42 in hydraulic system 44. Pressure transducer 45 may generate a signal indicative of the differential $\Delta_p$ across motor 42 and communicate the signal to controller 68. Controller 68 may also determine the volumetric flow rate Q of fluid in hydraulic system 44 based on a signal from a flowmeter disposed in hydraulic system 44 or based on the speed and displacement of motor 42 or pump 43. Controller 68 may then determine the power P used to drive conveyor 32 by multiplying of the pressure differential $\Delta_p$ and the volumetric flow rate Q.

When the power P is about equal to or within a certain range of the tare power $P_T$ during operation, controller 68 may determine that conveyor is not transferring material into haul vehicle 24 and may automatically recalibrate measurement system 60. This automatic calibration of measurement system 60 may reduce the amount of inaccurate data generated by force transducer under various circumstances. For example, when an amount of material builds up on roller assemblies 40, a corresponding force may appear to bear down on force transducer 56 at all times, regardless of the actual amount of material that is being transferred. As more material builds up on roller assemblies 40, or when some material is removed (e.g., falls off during operation or is cleaned off by personnel), it may become more difficult to determine how much material is actually on conveyor 32 or when conveyor 32 is or is not transferring material at all based on the signal from force transducer 56.

Pressure transducer 45, on the other hand, may generate a signal that can be used to determine how much power is needed to drive conveyor 32, which does not depend on how much material has built up on roller assemblies 40. Therefore, controller 68 may monitor the power P output of motor 42 and determine when no material is being transferred by conveyor 32, even when the signal from force transducer 56 appears to indicate that there is a load on roller assemblies 40 (e.g., due to material buildup). This may allow for more frequent recalibrations of measurement system 60 throughout the day and provide for more accurate measurements of the yield of cold planer 10.

Recalibrating measurement system 60 may include recalibrating force transducer 56 with a zeroing function to set the value of its output signal as a tare value for use in future measurements. In this way, the signal generated by force transducer 56 may exclude the force attributed to material accumulation on roller assemblies 40. Recalibrating measurement system 60 may also include resetting the tare power $P_T$ needed to drive conveyor 32. Controller 68 may reset the tare power $P_T$ so the effects of accumulated material are excluded from future determinations of the power P and determinations of when conveyor 32 is not transferring material.

During operation of cold planer 10, controller 68 may also determine the flow rate ṁ and/or weight $W_m$ of milled material based on the power P used to drive conveyor 32. For example, controller 68 may determine the speed Ω of a rotational device acted on by belt 38, such as a pulley, idler, or component of roller assembly 40. Controller 68 may then divide the power P used to drive conveyor 32 by the speed Ω of the rotational device to determine the torque τ applied by belt 38 on the rotational device. Controller 68 may have stored in its memory the radius R of the rotational device, and by dividing the torque τ by the radius R, controller 68 may determine the driving force $F_D$ needed to move the conveyor at its current speed.

The magnitude of the driving force $F_D$ may include a component attributed to the force of weight $F_w$ of the milled material being transferred by conveyor 32, and controller may determine the force of weight $F_w$ by multiplying the driving force $F_D$ by the sine of the angle of inclination θ of conveyor 32, as described in EQ4. Controller 68 may then determine the mass m of milled material on conveyor 32 by dividing the force of weight $F_w$ by the acceleration g of the milled material caused by gravity, as described in EQ5. Using the belt speed v detected by speed sensor 62 and mass m determined in EQ5 as inputs, controller 68 may continuously determine the mass flow rate ṁ of material being transferred by conveyor 32 using the relationship of EQ6. Controller 68 may also track the weight $W_m$ of material that has been transferred by the conveyor into haul vehicle 24 over an elapsed period of conveying time based on the mass flow rate ṁ, and display the mass flow rate ṁ and the weight $W_m$ to the operator via display 28a.

As cold planer 10 traverses work surface 17, milled material may be transferred into haul vehicle 24 via conveyor system 22 and transported away from the work area after haul vehicle 24 is full. Haul vehicle 24 may be full when the total weight $W_{total}$ of haul vehicle 24, including the weight $W_m$ of the milled material contained therein, reaches a maximum allowable weight, such as the weight limit $W_L$ selected by the operator or a legal weight limit.

The total weight $W_{total}$ of haul vehicle 24 may be equal to a tare weight $W_{tare}$ of haul vehicle 24 (i.e., the weight when empty) plus the weight $W_m$ of the milled material. The tare weight $W_{tare}$ of haul vehicle 24 may, for example, be stored within the memory of controller 68. In some embodiments, controller 68 may store a number of tare weights that correspond to various types and sizes of receptacles. In a particular embodiment, controller 68 may receive an operator selection of a receptacle type via input device 28c, and controller 68 may determine the total weight $W_{total}$ of haul vehicle 24 based on the operator selection. For example, the operator may choose from a number of receptacle types, and each receptacle type may be associated with a known tare weight $W_{tare}$. Each receptacle type may also be associated with one or more additional features, such as, for example, a maximum volume (e.g., a yardage), a model (e.g., model name, model number, etc.), a number of axles, a maximum weight rating (e.g., a tonnage), a shape or image of the receptacle, or other features. The operator may also or alternatively manually input the tare weight $W_{tare}$, maximum volume, or other information associated with haul vehicle 24 via input device 28c.

As cold planer 10 transfers milled material into haul vehicle 24, the fill level Σ of haul vehicle 24 may be determined based on the weight $W_m$ of the milled material and known features of haul vehicle 24. For example, controller 68 may continually add the weight $W_m$ of the milled material and the tare weight $W_{tare}$ of haul vehicle 24 to determine the total weight $W_m$ of haul vehicle 24. The total weight $W_{total}$ may be continually compared to the weight limit $W_L$ of haul vehicle 24 to determine the fill level Σ. For example, the fill level Σ may be the total weight $W_{total}$ of haul vehicle 24 as a percent of the weight limit $W_L$, as shown in EQ7 below.

$$\Sigma = 100 \times (1 - (W_L - W_{total})/W_L) \quad \text{EQ7}$$

The weight limit $W_L$ of haul vehicle 24 may be a weight limit determined by the operator, fleet manager, or manufacturer (e.g., based on maximum volume, fuel efficiency, travel distance, etc.) for improving the overall efficiency of haul vehicle 24 and/or the milling operation. Controller 68 may receive an operator selection or manual entry of the weight limit $W_L$ via input device 28c and compare the weight limit $W_L$ to the maximum legal weight limit stored within its memory or as provided by the operator via input device 28c. When the entered weight limit $W_L$ is less than or equal to the legal weight limit, controller 68 may determine the fill level Σ according to EQ7. However, when the weight limit $W_L$ is greater than the maximum legal weight limit, controller 68 may reduce the weight limit $W_L$ to the legal weight limit before determining the fill level Σ. It is understood that other ways of determining fill level Σ may be used, if desired.

The fill level Σ of haul vehicle 24 may be shown via display 28a to allow the operator to control cold planer 10 based on the fill level Σ of haul vehicle 24. This may allow the operator to avoid wastefully under-filling haul vehicle 24, while also avoiding over-filling haul vehicle 24 beyond its selected or legal weight limit $W_L$. For example, the operator may slow or stop the movement of traction devices 16, milling drum 12, and/or conveyor system 22 when the fill level Σ exceeds a threshold (e.g., 90% filled) or when haul vehicle 24 is full (e.g., when the fill level Σ reaches 100%). Display 28a may also or alternatively show other information relating to the milled material or the selected receptacle, such as the weight $W_m$ of milled material, the mass flow rate ṁ, and/or features of haul vehicle 24, such as the total weight $W_{total}$, the model number, the shape or image, and/or other identifying features of haul vehicle 24.

Controller 68 may also or alternatively exercise automatic control over operations of cold planer 10 based on the fill level Σ of haul vehicle 24. For example, controller 68 may monitor the fill level Σ of haul vehicle 24 and automatically reduce the amount of material being milled and transferred into haul vehicle 24 as the fill level Σ approaches a threshold (e.g., 90% filled). Controller 68 may regulate how much material is being milled and transferred into haul vehicle 24, for example, by adjusting the movement of traction devices 16, milling drum 12, and/or conveyor system 22.

Controller 68 may also determine when haul vehicle 24 is full based on the fill level Σ (e.g., when the fill level Σ reaches 100%), and track a number N of haul vehicles that have been filled over a period of time (e.g., hourly, daily, weekly, monthly, per shift, on a particular jobsite, etc.). Controller 68 may also record the final fill level Σ of each haul vehicle 24 before it is sent away, whether or not the haul vehicle 24 was full. This information may be stored in controller 68 and/or sent offboard via communication device 66.

When the fill level Σ of haul vehicle 24 reaches a threshold (e.g., 90% filled), controller 68 may generate a signal causing warning device 28b to visually or audibly notify the operator of cold planer 10 that haul vehicle 24 may soon reach the weight limit $W_L$. It is understood that greater or lower thresholds may be used, if desired. In one embodiment, for example, warning device 28b may generate a visual or audible signal that changes as the fill level Σ changes. For example, a sound or light pattern emitted by warning device 28b may increase in speed or intensify as the fill level Σ increases, and may become fastest or most intense just before the weight limit $W_L$, is reached. In some embodiments, warning device 28b may additionally or alternatively be detectable by the operator of haul vehicle 24 or other personnel in the area of cold planer 10. In this way, the operators of cold planer 10 and of haul vehicle 24 and others may be notified when haul vehicle 24 is ready to be moved.

During operation, cold planer 10 may continually or periodically exchange data with offboard receivers and transmitters. In some embodiments, cold planer 10 may send one or more of the weight $W_m$ of milled material, the fill level Σ of haul vehicle 24, the number N of filled haul vehicles 24, efficiency data, other productivity data, and/or other information offboard cold planer 10 via communication device 66. Controller 68 may generate data sets for a desired operational or analytical period, such for each hour, day, week, shift, jobsite, etc. Cold planer 10 may communicate processed data to an on- or off-site back office computer for further analysis, or send raw data to the back office computer before any preliminary analysis has been performed. Cold planer 10 may also communicate data and other information directly to receptacles or other machines, such as haul vehicle 24. For example, cold planer 10 may communicate the weight $W_m$, the fill level Σ, and/or other information to haul vehicle 24 for use by its operator and/or back office functions.

Several advantages may be associated with the disclosed measurement system. For example, because controller 68 may use the signal from pressure transducer 45 to monitor the actual power output of motor 42, controller 68 may be able to identify more opportunities to recalibrate force transducer 56 and to improve the accuracy of force measurements and calculations of the weight of material being transferred by conveyor 32. In addition, because controller 68 may also determine the weight of material being transferred by conveyor 32 based on the power output of motor 42, additional data may be available to improve weight measurements and/or crosscheck the accuracy of both transducers 45, 56. Further, because controller 68 may receive information about the receptacle receiving the milled material (e.g., haul vehicle 24), controller 68 may determine the fill level of the receptacle and indicate when the receptacle has been filled to a maximum legal weight or other desired weight limit.

It will be apparent to those skilled in the art that various modifications and variations can be made to the disclosed yield measurement system without departing from the scope of the disclosure. Other embodiments of the yield measurement system will be apparent to those skilled in the art from consideration of the specification and practice of the yield measurement system disclosed herein. It is intended that the specification and examples be considered as exemplary only, with a true scope of the disclosure being indicated by the following claims and their equivalents.

What is claimed is:

1. A yield measurement system for a cold planer having a conveyor, the yield measurement system comprising:
   a hydraulic motor configured to propel the conveyor;
   a first sensor configured to generate a first signal indicative of a force acting on the conveyor by material being moved by the conveyor;
   a second sensor configured to generate a second signal indicative of a pressure differential across the hydraulic motor; and
   a controller in communication with the first and second sensors, the controller being configured to:
   determine a power output of the hydraulic motor based on the second signal;
   determine when the conveyor is not transferring material based on the second signal;
   automatically recalibrate the yield measurement system based on the first signal when the conveyor is not transferring material, the automatic recalibration including setting the determined power output of the hydraulic motor as a tare power when the conveyor is not transferring material; and
   determine a mass flow rate of material being transferred by the conveyor based on the second signal.

2. The yield measurement system of claim 1, wherein the controller is configured to:
   determine a force exerted on the first sensor based on the first signal; and
   set the force as a tare force when the conveyor is not transferring material.

3. The yield measurement system of claim 2, wherein the determining that the conveyor is not transferring material based on the second signal includes determining when the power output of the hydraulic motor is about equal to a tare power.

4. The yield measurement system of claim 3, wherein the controller is further configured to determine a mass flow rate of material being transferred by the conveyor based on the first signal.

5. The yield measurement system of claim 1, further including an inclinometer in communication with the controller and configured to generate a third signal indicative of an angle of inclination of the conveyor, wherein the controller is configured to determine the mass flow rate of the material being transferred by the conveyor based further on the third signal.

6. The yield measurement system of claim 5, wherein the controller is further configured to determine a total weight of material transferred by the conveyor based on the mass flow rate and an elapsed period of conveying time.

7. The yield measurement system of claim 6, wherein:
   the conveyor is configured to transfer material into a receptacle; and
   the controller is configured to determine a fill level of the receptacle based on at least one of the mass flow rate and the total weight of material transferred by the conveyor and known geometry of the receptacle.

8. A method of operating a yield measurement system for a cold planer having a conveyor driven by a hydraulic motor, the method comprising:
   receiving a first signal indicative of a force on the conveyor applied by material being transferred by the conveyor;
   determining the force on the conveyor based on the first signal;
   receiving a second signal indicative of a pressure differential across the hydraulic motor;
   determining a power output of the hydraulic motor based on the second signal;
   determining that the conveyor is not transferring material when the power output of the hydraulic motor is within a range of a tare power;
   determining when the conveyor is not transferring material based on the second signal;
   automatically recalibrating a tare force and the tare power of the yield measurement system based on the first and second signals when the conveyor is not transferring material, the automatically recalibrating the tare force and the tare power including setting the force on the conveyor as the tare force when the conveyor is not transferring material and setting the power output of the hydraulic motor as the tare power when the conveyor is not transferring material; and determining a mass flow rate of material being transferred by the conveyor based on the first signal.

9. The method of claim 8, further including determining the mass flow rate of material being transferred by the conveyor based on the second signal.

10. The method of claim 9, further including:
receiving a third signal indicative of an angle of inclination of the conveyor; and
determining the mass flow rate of the material being transferred by the conveyor based further on the third signal.

11. The method of claim 10, further including:
transferring material into a receptacle via the conveyor;
determining a total weight of material transferred by the conveyor based on the mass flow rate and an elapsed period of conveying time; and
determining a fill level of the receptacle based on at least one of the mass flow rate and the total weight of material transferred by the conveyor and known geometry of the receptacle.

\* \* \* \* \*